United States Patent
Aoki et al.

(10) Patent No.: US 6,688,120 B2
(45) Date of Patent: Feb. 10, 2004

(54) VEHICLE AIR CONDITIONER WITH COLD STORAGE AND COLD RELEASE

(75) Inventors: Shinji Aoki, Chiryu (JP); Hiroyuki Tomita, Nagoya (JP); Shigeki Harada, Toyota (JP)

(73) Assignee: Denso Corporation, Kariya (JP)

( * ) Notice: Subject to any disclaimer, the term of this patent is extended or adjusted under 35 U.S.C. 154(b) by 96 days.

(21) Appl. No.: 10/105,742

(22) Filed: Mar. 25, 2002

(65) Prior Publication Data

US 2002/0134093 A1 Sep. 26, 2002

(30) Foreign Application Priority Data

Mar. 26, 2001 (JP) ........................................ 2001-088588
Jan. 23, 2002 (JP) ........................................ 2001-013999

(51) Int. Cl.[7] ............................ B60H 1/32; F25D 17/04
(52) U.S. Cl. ............................. 62/133; 62/231; 62/244
(58) Field of Search ........................... 62/59, 133, 157, 62/231, 244

(56) References Cited

U.S. PATENT DOCUMENTS

| 4,959,974 A | * | 10/1990 | Kusakabe | ................. 62/228.5 |
| 5,735,133 A | * | 4/1998 | Voss et al. | ................. 62/185 |
| 6,330,909 B1 | | 12/2001 | Takahashi et al. | |
| 6,470,960 B2 | * | 10/2002 | Kampf et al. | ................. 165/42 |

* cited by examiner

Primary Examiner—William E. Tapolcai
(74) Attorney, Agent, or Firm—Harness, Dickey & Pierce, PLC

(57) ABSTRACT

In a control unit of a vehicle air conditioner, a necessary time period T1, between the present time and a time at which the vehicle is stopped next, and a vehicle stopping time period T2, between the time at which the vehicle is stopped next and a time at which the vehicle is re-started, are estimated based on vehicle-travel state information and traffic signal information in a vehicle traveling. Further, a necessary cold release amount Q required for cooling in the vehicle stopping time period T2 is calculated based on the vehicle stopping time period T2, and a cold storage operation is controlled so that the necessary cold release amount Q is stored for the necessary time period T1.

20 Claims, 10 Drawing Sheets

VEHICLE AIR CONDITIONER WITH COLD STORAGE AND COLD RELEASE

CROSS-REFERENCE TO RELATED APPLICATION

This application is related to and claims priority from Japanese Patent Applications No. 2001-88588 filed on Mar. 26, 2001 and No. 2002-13999 filed on Jan. 23, 2002, the contents of which are hereby incorporated by reference.

BACKGROUND OF THE INVENTION

1. Field of the Invention

The present invention relates to a vehicle air conditioner for performing a cold storage operation using power of a vehicle engine, and for cooling air to be blown into a passenger compartment by performing a cold release operation when the vehicle engine is stopped.

2. Description of Related Art

Recently, for environmental protection, an engine is automatically stopped in a vehicle such as an economy running vehicle and a hybrid vehicle when the vehicle is stopped at a traffic signal or the like. However, when a compressor is driven by power from the vehicle engine in a vehicle air conditioner, the compressor is also stopped every time when the vehicle is stopped at a traffic signal. Accordingly, temperature of an evaporator is increased, and temperature of air to be blown into the passenger compartment is increased. As a result, cooling feeling for a passenger in the passenger compartment may be deteriorated.

To overcome this problem, a cold storage operation can be performed using power from the vehicle engine while the vehicle travels, and thereafter, air to be blown into a passenger compartment can be cooled by performing a cold release operation while the vehicle stops. However, when the vehicle is stopped for a long time, a cold storage amount becomes deficient, and cooling feeling for the passenger in the passenger compartment is deteriorated. On the contrary, when the vehicle is stopped for a short time, the cold storage amount becomes excessive, and power consumed in the vehicle engine is increased.

SUMMARY OF THE INVENTION

In view of the above problems, it is an object of the present invention to provide a vehicle air conditioner which improves cooling feeling for a passenger while a vehicle engine is stopped, and reduces power consumed in the vehicle engine by suitably controlling a cold storage amount.

According to the present invention, in an air conditioner for a vehicle having a navigation unit for searching vehicle-travel state information and road information, the air conditioner includes an evaporator for cooling air to be blown into a passenger compartment, a compressor driven by power of a vehicle engine, a cold storage unit for performing a cold storage operation using cooling operation of the evaporator, and a control unit for controlling cooling temperature of the evaporator. In the air conditioner, when the vehicle engine is driven, the control unit selects one of a cold storage mode where the cooling temperature of the evaporator is made lower than a predetermined temperature so that the cold storage operation in the cold storage unit is performed, and a normal cooling mode where the cooling temperature of the evaporator is higher than that in the cold storage mode. On the other hand, when the vehicle engine is stopped, the control unit selects a cold release mode where air is cooled by using cold release operation from the cold storage unit. The control unit estimates a necessary time period from a present time to a time at which the vehicle is stopped next, and a vehicle stopping time period from the time at which the vehicle is stopped next and a time at which the vehicle is re-started, based on the vehicle-travel state information and the road information searched by the navigation unit. Further, the control unit calculates a necessary cold release amount necessary for cooling in the vehicle-stopping time period based on the estimated vehicle-stopping time period, and controls operation of the cold storage mode so that the cold storage is performed in the necessary time period by a cold storage amount corresponding to the necessary cold release amount. Accordingly, the cold storage amount can be suitably controlled in accordance with the vehicle-stopping time period, so that cooling feeling for a passenger can be improved while the vehicle is stopped, and power consumed in the vehicle engine can be effectively reduced.

Recently, the present position of the vehicle, a travel direction thereof and a vehicle speed can be detected using Global Positioning system (GPS), a gyro and the like. Further, a navigation unit and the like include map information having traffic-signal position information. In the future, the navigation unit will include operation notice information for indicating a time for which a signal changes between red and green. Thus, the navigation unit includes a travel state detection device for detecting the travel state information having at least a vehicle present position, a vehicle-travel direction and a vehicle travel speed, and the navigation unit has traffic signal information for indicating a traffic signal position and a switching operation thereof. Preferably, while the vehicle is in travelling, the necessary time period and the vehicle stopping time period are estimated based on the travel state information and the traffic signal information. Accordingly, the necessary time period and the vehicle stopping time period can be more accurately estimated.

Preferably, the compressor is disposed to recover inertial power of the vehicle using the cold storage operation of the cold storage unit when the compressor is driven by the inertial power, the control unit estimates a time zone for which the inertial power is recovered among the necessary time period, based on the vehicle-travel state information and the traffic signal information, and the cold storage mode is preferentially performed in the time zone among the necessary time period. Therefore, the inertial power can be effectively used, and the power consumed in the vehicle engine can be further reduced.

In a case where the vehicle has a generator driven by one of the power of the vehicle engine and the inertial power, and has a battery unit charged by the generator, the control unit controls charging operation of the battery unit to charge necessary electric power required to start the vehicle in the battery unit at least in the necessary time period, the control unit estimates rotational speed fluctuations of the compressor and the generator in the time zone based on the vehicle-travel state information and the traffic signal information, and the control unit calculates operational efficiency fluctuations of the compressor and the generator in the time zone using the rotational speed fluctuations, respectively. In this case, when an actual cold storage amount of the cold storage unit is smaller than the necessary cold release amount and a charging power of the battery unit is smaller than the necessary electric power, the compressor and the generator are driven while the time zone is divided into a drive time zone of the compressor and a drive time zone of the generator, so that the inertial power is recovered at each high operational efficiency of the compressor and the generator, higher than a predetermined level.

When the vehicle includes vehicle speed detection means for detecting vehicle speed information related to a vehicle speed, and a memory member for storing the vehicle speed information, when it is estimated, based on the past vehicle speed information stored in the memory member, that the vehicle travels on a city road in which the vehicle is stopped at every predetermined time, the control unit selects the cold storage mode. Because it can be more accurately determined whether the vehicle travels on a city road and the cold storage mode is performed when the vehicle travels on a city road, cooling feeling for the passenger can be effectively improved while the vehicle is stopped on the city road, and engine power can be saved. Preferably, the control unit beforehand sets a specific fluctuation pattern of the vehicle speed as a fluctuation pattern of the vehicle speed on a city road. In this case, when the past fluctuation pattern of the vehicle for a past predetermined time is similar to the specific fluctuation pattern, the control unit estimates that the vehicle travels on a city road. Alternatively, the control unit calculates an average vehicle speed for the past predetermined time based on the vehicle speed information. In this case, when the average vehicle speed is lower than a predetermined vehicle speed, the control unit estimates that the vehicle travels on a city road. Alternatively, the control unit calculates a number of vehicle stop for a past predetermined time, based on the vehicle speed information. In this case, when the number of vehicle stop is more than a predetermined number, the control unit determines that the vehicle travels on a city road.

Further, in the air conditioner, when it is estimated that the vehicle is on a city road based on a vehicle present position and map information, the cold storage mode is selected. In this case, it can be more accurately determined whether the vehicle travels on a city road. Therefore, cooling feeling for the passenger can be effectively improved while the vehicle is stopped, and engine power can be saved.

Preferably, the control unit calculates a distance between neighboring traffic signals around the present position of vehicle based on the present position of the vehicle and the map information. In this case, when the distance is shorter than a predetermined distance, the control unit estimates that the vehicle is on a city road. Alternatively, the control unit beforehand sets a specific area as a city road in the map information. In this case, when the vehicle is in the specific area, the control unit estimates that the vehicle is on a city road.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the accompanying drawings.

Figure 1:
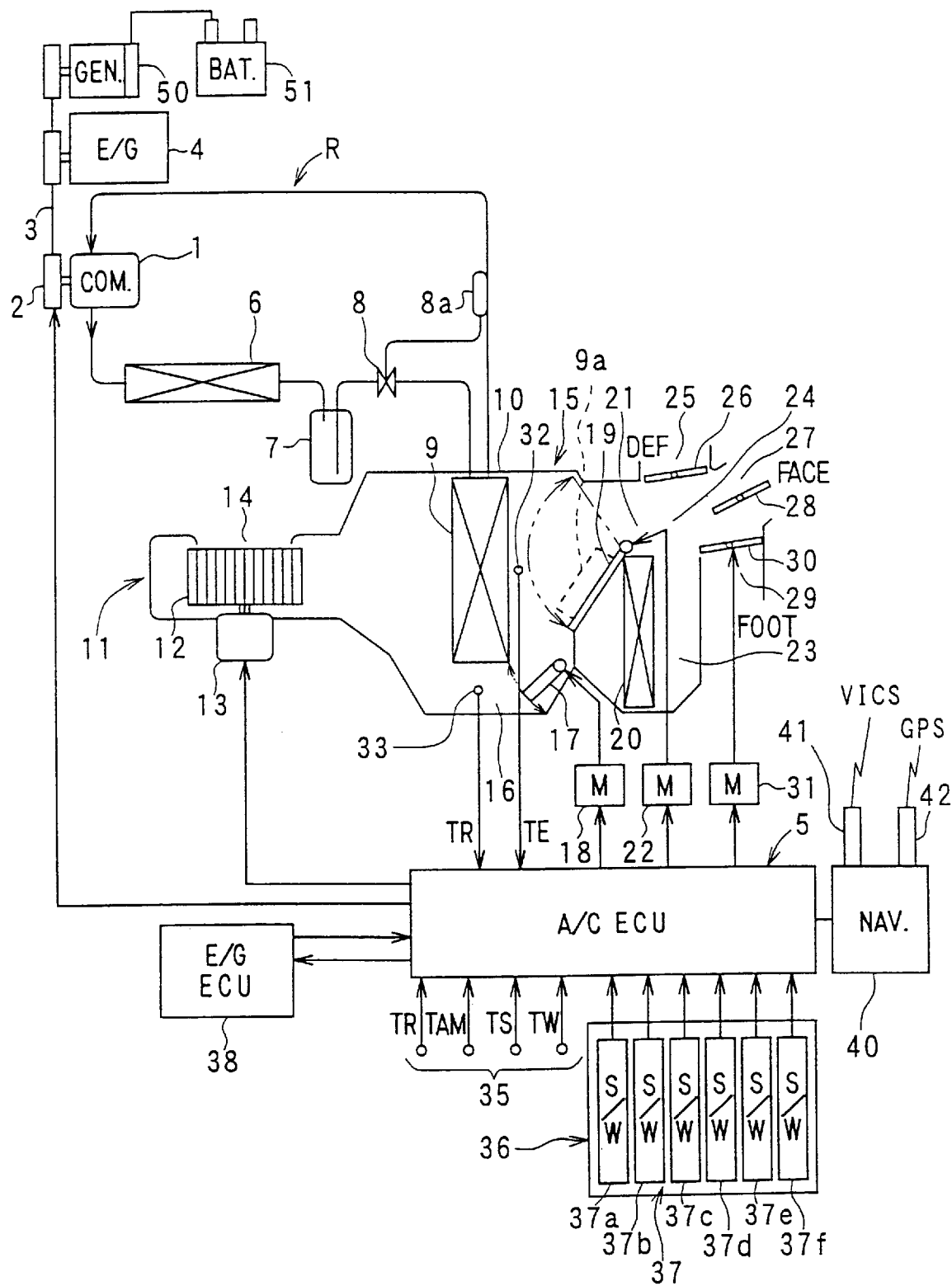
FIG. 1 is a schematic diagram showing an entire system with a vehicle air conditioner according to embodiments of the present invention.

A first embodiment of the present invention will be now described with reference to FIGS. 1–6. As shown in FIG. 1, a refrigerant cycle system R of a vehicle air conditioner includes a compressor 1 for sucking, compressing and discharging refrigerant circulating in the refrigerant cycle system R. The compressor 1 includes a solenoid clutch 2 for interrupting power from a vehicle engine 4. The power of the vehicle engine 4 is transmitted to the compressor 1 through the solenoid clutch 2 and a belt 3. The compressor 1 can be driven also by inertial power of the vehicle. The inertial power of the vehicle can be also recovered as a cold storage by increasing a cold storage amount of condensed water of an evaporator 9 described later.

Energization for the solenoid clutch 2 is interrupted by an air-conditioning electronic control unit (air-conditioning ECU) 5. The compressor 1 and the engine 4 are connected through the solenoid clutch 2 when the solenoid clutch 2 is energized. When the solenoid clutch 2 is de-energized, the compressor 1 is separated from the engine 4, and the compressor 1 is stopped. Supper-heated gas refrigerant, having a high temperature and a high pressure, is discharged from the compressor 1, and flows into a condenser 6 so that the supper-heated refrigerant is heat-exchanged with outside air and is cooled and condensed in the condenser 6. The condensed refrigerant in the condenser 6 flows into a receiver 7, to be separated into gas refrigerant and liquid refrigerant in the receiver 7. Here, excess refrigerant in the refrigerant cycle system R is stored in the receiver 7.

The liquid refrigerant from the receiver 7 is decompressed by an expansion valve (decompression device) 8 to be gas-liquid refrigerant having a low pressure. The low-pressure refrigerant from the expansion valve 8 flows into the evaporator (cooling heat exchanger) 9 disposed in an air-conditioning case 10 of the air conditioner. The low-pressure refrigerant flowing through the evaporator 9 absorbs heat from air in the air-conditioning case 10 to be evaporated. The expansion valve 8 is a thermal expansion valve having a temperature sensing portion 8a for detecting temperature of refrigerant at an outlet of the evaporator 9. The expansion valve 8 adjusts a valve open degree (refrigerant flow amount), so that a super heating degree of refrigerant at the outlet of the evaporator 9 is maintained at a predetermined degree. The outlet of the evaporator 9 is coupled to a suction side of the compressor 1. Thus, a closed refrigerant circuit of the refrigerant cycle system R is constructed by the above-described components.

In the air-conditioning case 10, a blower 11 is disposed at an air upstream side of the evaporator 9. The blower 11 includes a centrifugal blower fan (blower fan) 12 and a driving motor 13 for driving the blower fan 12. Air inside a passenger compartment (inside air) or/and air outside the passenger compartment (outside air) is introduced into a suction port 14 of the blower fan 12 through an inside/outside air switching box (not shown). In an air-conditioning ventilation system of the air conditioner, an air-conditioning unit 15 is disposed at an air downstream side of the blower 11. The air-conditioning unit 15 is generally disposed on a front side in a passenger compartment, inside an instrument panel, at an approximate center in a vehicle lateral direction. The blower 11 is offset from the air-conditioning unit 15 to be positioned at a passenger seat side.

The evaporator 9 is disposed in the air-conditioning case 10 to extend in an up-down direction, and to form a first bypass passage 16, through which air bypasses the evaporator 9, below the evaporator 9 in the air-conditioning case 10. In an example shown in FIG. 1, a bypass door (parallel bypass door) 17, for adjusting an open degree of the first bypass passage 16, is disposed at an air downstream side of the evaporator 9 on a lower side of the evaporator 9. The bypass door 17 is a rotatable plate door, and is driven by an electric driving unit 18 with a servomotor. An air mixing door (series bypass door) 19 is disposed at an air downstream side of the evaporator 9 in the air-conditioning case 10. A hot-water heater core (heater core) 20, for heating air using hot water (cooling water) of the engine 4 as a heat source, is disposed at an air downstream side of the air mixing door 19. A second bypass passage 21 is provided at a lateral side (upper side) of the heater core 20, so that air bypasses the heater core 20 through the second bypass passage 21.

The air mixing door 19 is a rotatable plate-like door, and is driven by an electric driving unit 22 having a servo motor. The air mixing door 19 adjusts a ratio of an air flow amount passing through the heater core 20 and an air flow amount passing through the second bypass passage 21 while bypassing the heater core 20. That is, the air mixing door 19 is used as a temperature adjusting unit for adjusting the temperature of air to be blown into the passenger compartment by adjusting the air flow ratio. In the present example, the bypass door 17 is used as an auxiliary temperature adjusting unit relative to the air mixing door 19.

A warm air passage 23, extending from a lower side upwardly, is provided at an air downstream side of the heater core 20. The warm air from the warm air passage 23 and the cool air from the second bypass passage 21 are mixed around an air mixing portion 24, so that conditioned air having a desired temperature can be obtained.

A blow-mode switching portion is constructed in the air-conditioning case 10 at an air downstream side of the air mixing portion 24. Specifically, a defroster opening 25 is provided on an upper surface of the air-conditioning case 10, so that conditioned air is blown toward an inner surface of a windshield from the defroster opening 25 through a defroster duct (not shown). The defroster opening 25 is opened and closed by a rotatable plate-like defroster door 26.

A face opening 27 is provided on the upper surface of the air-conditioning case 10 at a vehicle rear side of the defroster opening 25, so that conditioned air is blown toward the upper half body of a passenger in the passenger compartment from the face opening 27 through a face duct (not shown). The face opening 27 is opened and closed by a rotatable plate-like face door 28.

In the air-conditioning case 10, a foot opening 29 is provided below the face opening 27, so that conditioned air is blown toward the foot portion of the passenger in the passenger compartment from the foot opening 29 through a foot duct (not shown). The foot opening 29 is opened and closed by a rotatable plate-like foot door 30. The doors 26, 28, 30 for switching an air outlet mode are connected to a common link mechanism (not shown), and are driven by an electric driving unit 31 having a servomotor through the link mechanism.

Next, an electronic control portion according to the first embodiment will be now described. An evaporator air temperature sensor 32 having a thermistor is disposed at a position immediately after an air outlet portion of the evaporator 9, to detect an evaporator air temperature TE blown immediately after the evaporator 9. In the first bypass passage 16, a bypass air temperature sensor 33 having a thermistor is disposed to detect temperature (bypass temperature) TB of air flowing through the first bypass passage 16 while bypassing the evaporator 9.

Detection signals from a sensor group 35 and the above sensors 32, 33 are inputted to the air-conditioning ECU 5. The sensor group 35 includes plural sensors for detecting an inside air temperature TR, an outside air temperature TAM, a solar radiation amount TS, a hot water temperature TW and the like used for air-conditioning control. Further, an operation switch group 37, manually operated by a passenger, is provided on an air-conditioning control panel 36 disposed around an instrument panel in the passenger compartment. Operation signals from the operation switch group 37 are inputted to the air-conditioning ECU 5.

The operation switch group 37 includes a temperature setting switch 37a, a cold storage switch 37b, an air amount changing switch 37c, a blow mode switch 37d, an inside/outside air changing over switch 37e, an air-conditioning switch 37f and the like. The temperature setting switch 37a generates a temperature setting signal corresponding to a set temperature TSET, the cold storage switch 37b generates a cold storage mode signal for setting a cold storage mode, the air amount changing switch 37c generates an air amount changing signal, the blow mode switch 37d generates an air outlet mode signal, the inside/outside air changing over switch 37e generates an inside/outside air switching signal, and the air-conditioning switch 37f generates an ON-OFF signal for the compressor 1.

The air-conditioning ECU 5 is electrically connected to an engine electronic control unit (engine ECU) 38. A rotational speed signal of the engine 4 and a vehicle speed signal are inputted from the engine ECU 38 to the air-conditioning ECU 5.

The engine ECU 38 generally controls a fuel injection amount for the engine 4, an ignition timing and the like based on detection signals from a sensor group (not shown) for detecting an operation state of the engine 4 and the like. In an economy running vehicle or a hybrid vehicle to which the present invention is applied, when the engine ECU 38 determines that the vehicle is stopped based on the rotational speed signal of the engine 4, the vehicle speed signal, a brake signal and the like, the engine ECU 38 automatically stops the engine 4 by stopping the fuel injection and the like. When the vehicle is started from a stopping state by a driving operation of a driver, the engine ECU 38 determines the starting operation of the vehicle based on an accelerator pedal signal and the like, and the engine 4 is automatically started.

Each of the air-conditioning ECU 5 and the engine ECU 38 is constructed by a microcomputer having a central processing unit (CPU), a read only memory (ROM), a random access memory (RAM) and the like. The air-conditioning ECU 5 includes an engine-control signal output portion, a compressor-interruption control portion, an inside/outside air introduction control portion, a flow amount control portion, a temperature control portion, a blow mode control portion and the like. The engine-control signal output portion of the air-conditioning ECU 5 outputs an engine control signal to the engine ECU 38, and the compressor-interruption control portion is for performing on-off control operation of the compressor 1 using the solenoid clutch 2. The inside/outside air introduction control portion controls an inside/outside air switching door, and the flow amount control portion controls the operation of the blower 11. The temperature control portion controls the bypass door 17 and the air mixing door 19, and the blow mode control portion controls the doors 26, 28, 30 for the air openings 25, 27, 29.

On the other hand, the air-conditioning ECU 5 is electrically connected to a navigation unit 40, to communicate with the navigation unit 40. The navigation unit 40 includes a communication device 41 for receiving traffic information from Vehicle Information and Communication System (VICS) and the like. The traffic information includes traffic signal information indicating a position of each traffic signal and a signal switching time (signal notice time) between green and red thereof.

Further, the navigation unit 40 includes a travel-state detecting device for detecting travel state information including at least a vehicle present position, a vehicle traveling direction and a vehicle speed. The travel-state detecting device is constructed by a receiving device (position detecting device) 42 and a calculating device. The receiving device 42 receives a satellite signal such as a signal from Global Positioning system (GPS), and the calculating device calculates the vehicle present position, the vehicle traveling direction and the vehicle speed based on the received signal. Here, the vehicle speed signal from the engine ECU 38 may be used for the vehicle speed in the air-conditioning ECU 5. Then, the travel state information and the traffic signal information are inputted from the navigation unit 40 to the air-conditioning unit 5. For example, the traffic signal information is obtained by a wireless communication system from an outside of the vehicle.

Next, operation of the air conditioner having above structure according to the first embodiment will be now described. As shown in the flow diagram of FIG. 2, a control routine is performed by the microcomputer of the air-conditioning ECU 5. When the air-conditioning ECU 5 is energized by turning on an ignition switch of the engine 4 and when the air amount switch 37c (or an automatic switch) in the operation switch group 37 is turned on, the control routine is started.

First, at step S100, flags, timers and the likes are initialized. At step S110, the detection signals from the sensors 32, 33 and the sensor group 35, the operation signals from the operation switch group 37, the vehicle driving signal from the engine ECU 38 and the likes are input.

At step S120, a target air temperature TAO of conditioned air to be blown into the passenger compartment is calculated based on the formula (1). This target air temperature TAO is required to maintain an air temperature in the passenger compartment at the set temperature TSET.

$$TAO = KSET \times TSET - KR \times TR - KAM \times TAM - KS \times TS + C \quad (1)$$

Wherein, TR is the inside air temperature detected by the inside air temperature sensor of the sensor group 35, TAM is the outside air temperature detected by the outside air temperature sensor of the sensor group 35, TS is the solar radiation amount detected by the solar radiation sensor of the sensor group 35, KSET, KAM and KS indicate control gains, respectively, and C indicates a correction constant.

Then, at step S121, the microcomputer of the air-conditioning ECU 5 reads the rotational speed signal of the engine 4 and the travel state information including at least the present vehicle position, the vehicle traveling direction and the vehicle speed, and calculates the vehicle speed based on the read signals and information. At step S123, the microcomputer of the air-conditioning ECU 5 reads the traffic signal information indicating a position of each traffic signal and a signal switching time thereof, and determines whether the vehicle is stopped at the next traffic signal based on the vehicle speed calculated at step S121 and the read traffic signal information. When it is determined that the vehicle will be stopped at the next traffic signal, a vehicle stopping time period at the next traffic signal is calculated.

At step S125, an air-conditioning mode is determined to be switched at one of a cold storage mode, a cold release mode and a normal cooling mode. In the present example, when the air conditioner (blower 11) is operated while the engine 4 (compressor 1) is driven, the air-conditioning mode is suitably switched between the cold storage mode and the normal cooling mode. In the normal cooling mode, the target evaporator air temperature (target evaporator temperature) TEO is set higher, and cooling operation is performed while a cold storage operation is forbidden. In the cold storage mode, the target evaporator air temperature TEO is forced to be set lower, and the cooling operation is performed while the cold storage operation is performed. When the cold storage switch 37b is turned off, the normal cooling mode is generally selected. On the other hand, when the air conditioner (blower 11) is operated while the engine 4 (compressor 1) is stopped, the cold release mode is selected.

Next, detailed control operation at steps S121, S123, S125 will be now described. While the vehicle is traveling, a time period T1 (necessary time period) from the present time to a time at which the vehicle will be next stopped, and a vehicle stopping time period T2 from the time at which the vehicle will be stopped next to a time at which the vehicle is again started, are estimated based on the vehicle travel state information and the traffic signal information inputted from the navigation unit 40. Next, a necessary cold release amount Q necessary for cooling for the vehicle stopping time period T2 is calculated based on the estimated vehicle stopping time period T2. The air-conditioning mode is switched between the cold storage mode and the normal cooling mode so as to perform the cold storage operation during the time period T1 in accordance with the necessary cold release amount Q. That is, the cold storage operation is performed during the time period T1, so that only a cold storage amount corresponding to the necessary cold release amount Q can be obtained. Further, a recovery time zone T3 for which inertial power of the vehicle can be recovered in the time period T1 is estimated based on the travel state information and the traffic signal information from the navigation unit 40. The air-conditioning mode is switched so as to perform the cold storage operation preferentially for the recovery time zone T3 in the time period T1.

Figure 3:
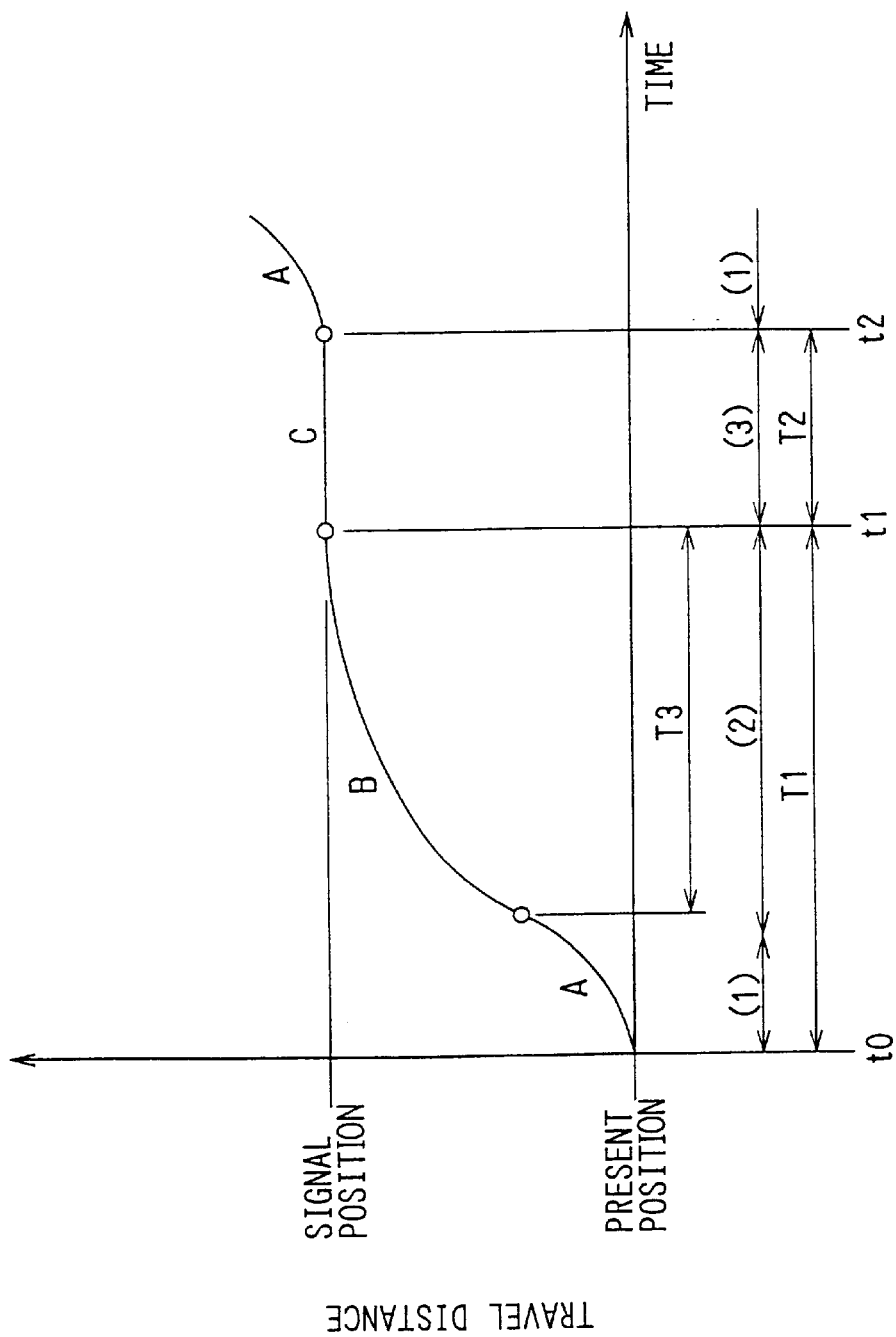
FIG. 3 is a graph for explaining a mode selection in an air-conditioning mode according to the first embodiment.

FIG. 3 shows a mode selection example of the air-conditioning mode and the vehicle travel state in a graph showing a relationship between a travel time and a travel distance. In FIG. 3, A indicates the vehicle travel state using engine power, B indicates the vehicle travel state using inertial power such as on a downward slope, C indicates the vehicle stopping state. Reference number (1) indicates a time zone where the normal cooling mode is selected, reference number (2) indicates a time zone where the cold storage mode is selected, and reference number (3) indicates a time zone where the cold release mode is selected, respectively. Further, t0, t1, t2 indicate the present time, a time at which the vehicle will be stopped next, and a time at which the vehicle will be again started, respectively. In the example shown in FIG. 3, when the engine 4 (compressor 1) is driven and the cold storage switch 37b is turned on, the air-conditioning mode can be automatically switched between the normal cooling mode and the cold storage mode so that the cold storage operation is performed to obtain only the necessary cold release amount Q in the time period T1. Therefore, the cold storage amount can be suitably controlled, so that cooling feeling for the passenger in the passenger compartment can be improved when the vehicle engine is stopped, while engine power can be saved.

The cold storage operation is performed preferentially for the recovery time zone T3 among the time period T1. Because necessary cold release amount Q can be stored using the inertial power preferentially more than using the engine power, engine power can be further saved. Here, when the cold storage switch 37b is turned off while the engine 4 (compressor 1) is driven, the normal cooling mode is selected. When the air conditioner (blower 11) is operated while the engine 4 (compressor 1) is stopped, the cold release mode is selected.

Figure 2:
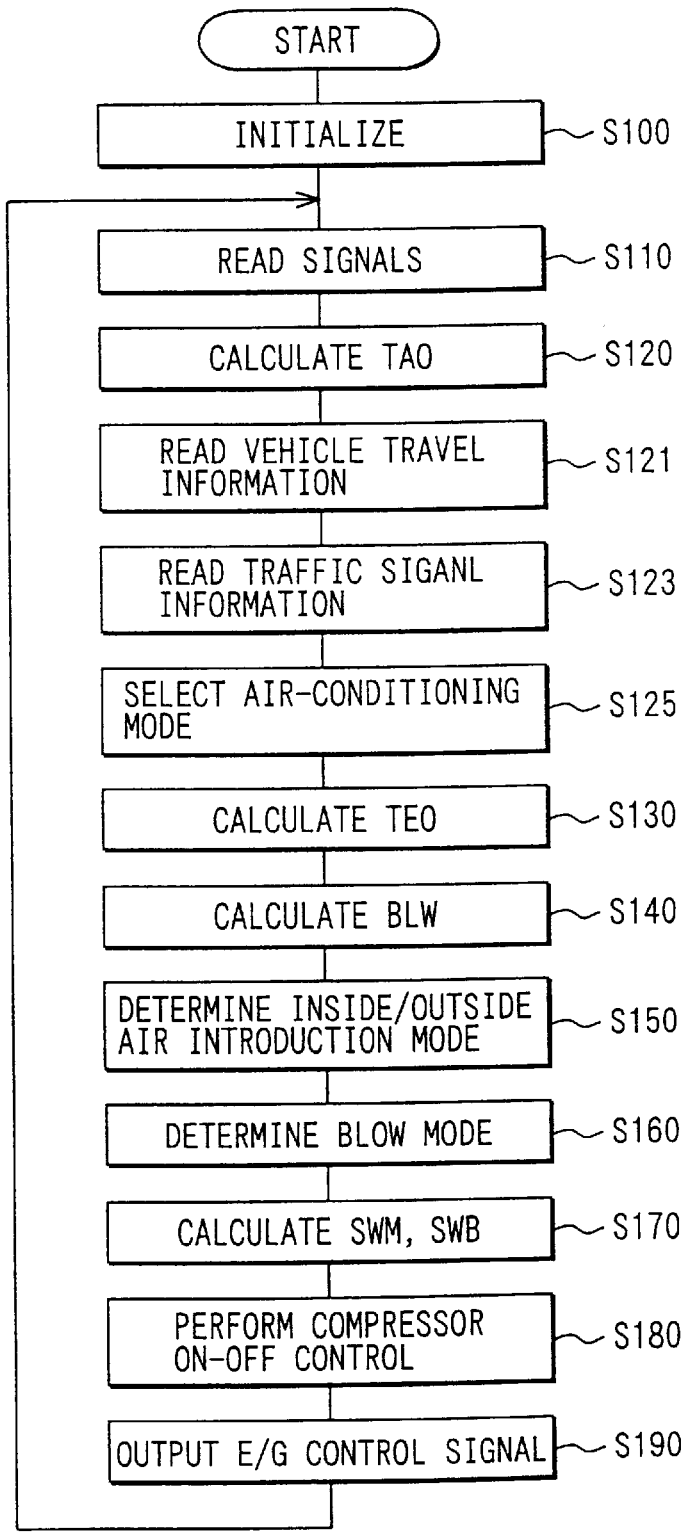
FIG. 2 is a flow diagram showing basic control processes according to a first embodiment of the present invention.
Figure 4:
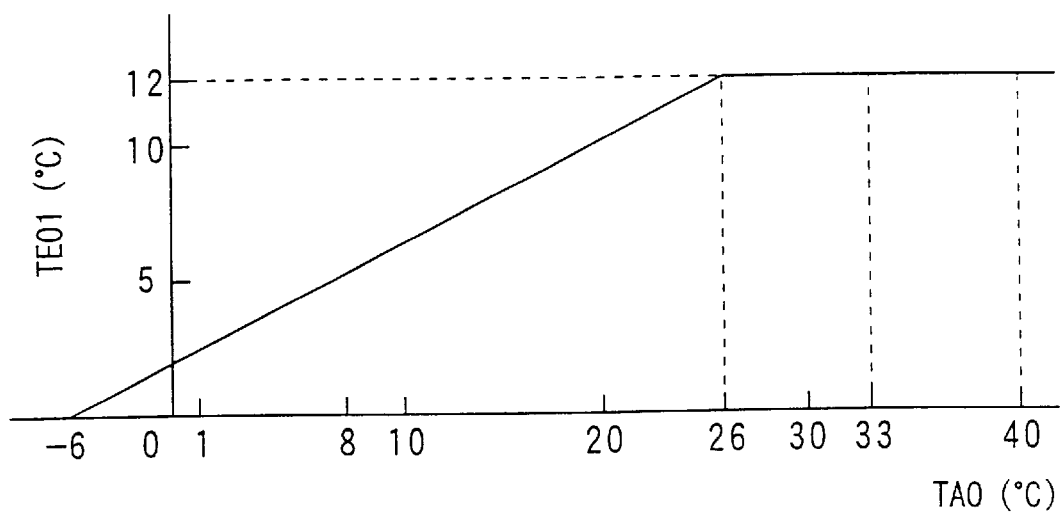
FIG. 4 is a characteristic graph showing a relationship between a first target evaporator air temperature TEO1 and a target air temperature TAO, according to the first embodiment.

Next, at step S130 in FIG. 2, the target evaporator air temperature TEO is calculated based on the following first to third target evaporator temperatures TEO1, TEO2, TEO3. The first target evaporator air temperature TEO1 is beforehand stored in the ROM of the microcomputer as shown by the graph in FIG. 4. As shown in FIG. 4, as the target air temperature TAO increases, the first target evaporator air temperature TEO1 is increased. Therefore, the relationship between the first target evaporator temperature TEO1 and the target air temperature TAO can be indicated by a formula of TEO1=f(TAO). In the present example, an upper limit of TEO1 is set at 12° C.

Figure 5:
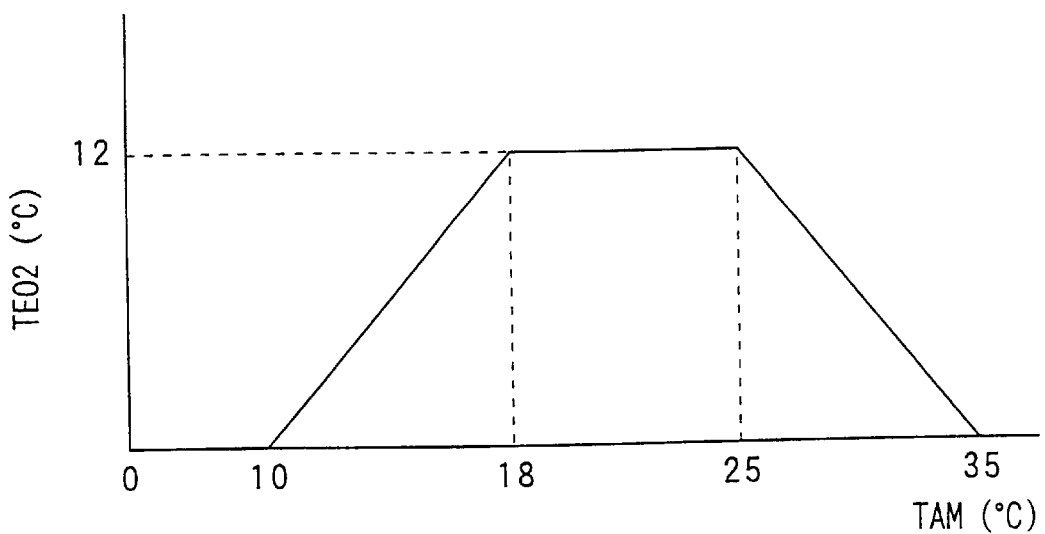
FIG. 5 is a characteristic graph showing a relationship between a second target evaporator air temperature TEO2 and an outside air temperature TAM, according to the first embodiment.

The second target evaporator air temperature TEO2 is also beforehand stored in the ROM of the microcomputer as shown by the graph in FIG. 5. As shown in FIG. 5, the second target evaporator air temperature TEO2 is determined based on the outside temperature TAM. The need for cooling or dehumidifying operation is reduced in an intermediate temperature area of TAM (e.g., 18–25° C. in FIG. 5) in the intermediate temperature area. Therefore, the second target evaporator air temperature TEO2 is set higher (12° C. in the example shown in FIG. 5), and the power consumed in the engine 4 is reduced by reducing an operation ratio of the compressor 1. In a high temperature area of TAM higher than 25° C. in summer, the second target evaporator air temperature TEO2 is reduced inversely proportional to the outside temperature TAM to ensure cooling performance. In a low temperature area of TAM lower than 18° C., the second target evaporator air temperature TEO2 is reduced proportional to the outside temperature TAM. When the outside temperature TAM is lower than 10° C., the second target evaporator air temperature TEO2 is set 0° C. Accordingly, TEO2 is indicated by f(TAM) (TEO2=f(TAM)). When the cold storage switch 37b is turned on, the third target evaporator air temperature TEO3 is set at a predetermined temperature Tf (e.g., −2° C.) lower than a freezing temperature.

During the normal cooling mode while the engine 4 is driven, the target evaporator air temperature TEO is determined based on the following formula (2) using the first and second target evaporator temperatures TEO1, TEO2.

$$TEO=MIN[f(TAO), f(TAM)] \quad (2)$$

In the formula (2), among the first and second target evaporator temperatures TEO1, TEO2 (f(TAO), f(TAM)), a lower one thereof is finally set as the target evaporator air temperature TEO. When the engine 4 is driven and the cold storage mode is selected, the target evaporator air temperature TEO is forced to be set at the predetermined temperature Tf lower than the freezing temperature.

At step S140, a target air-blowing amount BLW (target blower voltage) of air, blown by the blower 11, is calculated using the target air temperature TAO. Specifically, target air-blowing amount BLW is set larger in a higher temperature area (maximum heating area) of the target air temperature TAO and a lower temperature area (maximum cooling area) of target air temperature TAO, and is set smaller in an intermediate temperature area of the target air temperature TAO. A rotational speed of the driving motor 13 of the blower 11 is controlled by the air-conditioning ECU 5 so that the target air-blowing amount BLW can be obtained.

Next, at step S150, an inside/outside air introduction mode is determined in accordance with the target air temperature TAO. As the target air temperature TAO increases from a low temperature side to a high temperature side, the inside/outside air introduction mode is switched to an entire inside air mode, an inside/outside air mixing mode and an entire outside air mode, in this order. An operation position of an inside/outside air switching door (not shown) is controlled by the air-conditioning ECU 5 so that the inside/outside air introduction mode is selected. At step S160, a blow mode (air outlet mode) is determined in accordance with the target air temperature TAO. As the target air temperature TAO increases from a low temperature side to a high temperature side, the blow mode is switched to a face mode, a bi-level mode and a foot mode, in this order. The blow mode doors 26, 28, 30 are controlled by the air-conditioning ECU 5 through the electric driving unit 31 so that a blow mode corresponding to the target air temperature TAO can be obtained.

At step S170, a target open degree SWM of the air mixing door 19 and a target open degree SWB of the bypass door 17 are calculated, and an open degree of the air mixing door 19 and an open degree of the bypass door 17 are determined. Detail control operation at step S170 will be described later with reference to FIG. 6.

At step S180, the compressor 1 is on-off controlled while the target evaporator air temperature TEO is compared to an actual evaporator air temperature TE. That is, when the actual evaporator air temperature TE detected by the evaporator air temperature sensor 32 is lower than the target evaporator air temperature TEO, the solenoid clutch 2 is turned off by the air conditioning ECU 5, so that the compressor 1 is stopped. When the actual evaporator air temperature TE is higher than the target evaporator air temperature TEO, the solenoid clutch 2 is turned on by the air conditioning ECU 5, so that the compressor 1 is operated. Thus, the actual evaporator air temperature TE can be maintained at the target evaporator air temperature TEO. In the normal cooling mode, the actual evaporator air temperature TE is controlled in accordance with the target air temperature TAO and the outside air temperature TAM. Thus, the evaporator 9 can be prevented from being frosted, cooing and dehumidifying performance can be improved, and consumed power can be reduced by reducing an operation ratio in the compressor 1.

In the cold storage mode, the target evaporator air temperature TEO is reduced to the predetermined temperature Tf lower than the freezing temperature, so that condensed water of the evaporator 9 is freezed, and the cold storage amount of condensed water of the evaporator 9 is increased. In the first embodiment, the evaporator 9 can be used to have a cold storage function. However, a cold storage unit 9a, where a cold storage material is sealed in a closed container, may be disposed at a downstream air side of the evaporator 9 as indicated by broken lines in FIG. 1. In this case, the cold storage material in the cold storage unit 9a is freezed using air cooled by the evaporator 9, so that the cold storage operation can be performed using the cold storage unit 9a. For example, a paraffin-group cold storage material can be used as the cold storage material.

Next, at step S190, engine control signals, such as a stop permission signal for the vehicle engine 4, a stop prohibition signal for the vehicle engine 4 or a re-start request signal for the vehicle engine 4, is outputted based on an air-conditioning condition.

Figure 6:
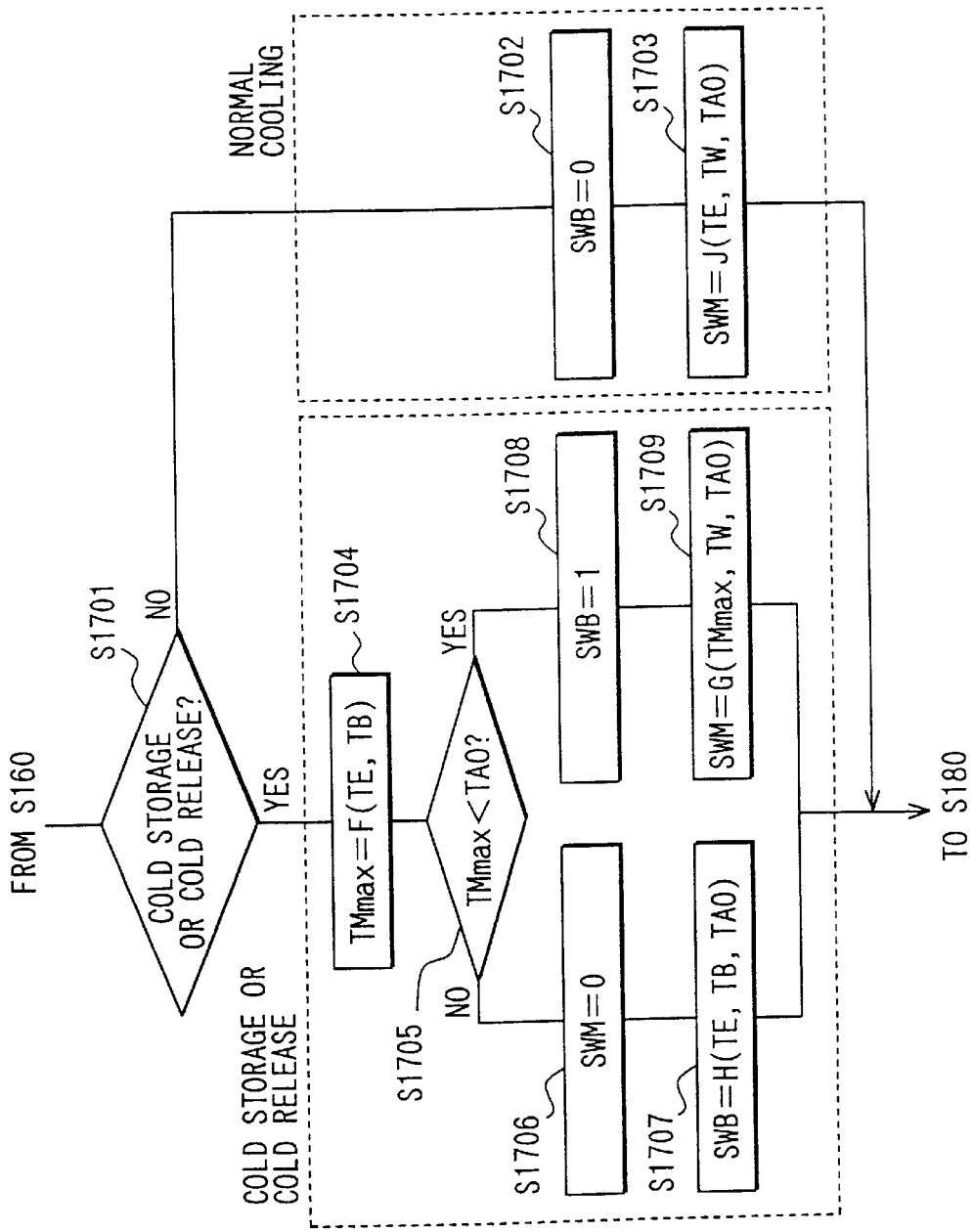
FIG. 6 is a flow diagram showing detail control at step S170 in FIG. 2.

Next, detail control at step S170 will be now described with reference to FIG. 6. First, at step S1701, it is determined whether or not the air-conditioning mode is the cold storage mode, the cold release mode or the normal cooling mode. Here, in the cold storage mode, the target evaporator air temperature TEO is reduced to the predetermined temperature Tf lower than the freezing temperature. The cold release mode is set in a case where the vehicle is stopped at a traffic signal. In the cold release mode, a stop request signal for the engine 4 is outputted from the engine ECU 38, and the engine 4 (compressor 1) is stopped. That is, in the cold release mode, the compressor 4 is stopped, and air is cooled using a cold release operation of the condensed water of the evaporator 9.

When the cold storage mode or the cold release mode is not selected as the air-conditioning mode, the target opening degree of the bypass door 17 is set to zero (SWB=0). That is, when the normal cooling mode is selected as the air-conditioning mode, the target open degree SWB of the bypass door 17 is set to zero (SWB=0) so that the bypass door 17 fully closes the first bypass passage 16. Then, at step S1703, the target open degree SWM of the air mixing door 19 is calculated using the following formula (3).

$$SWM = J(TE, TW, TAO) \quad (3)$$

Wherein, SWM is calculated using the actual evaporator air temperature TE, the hot water temperature TW and the target air temperature TAO to obtain the target air temperature TAO. Here, the target open degree SWM is calculated in order to obtain the target air temperature TAO to be blown into the passenger compartment. The target opening degree SWM of the air mixing door 19 is set to 0% at a maximum cooling position where the air passage of the heater core 20 is entirely closed, and to 100% at a maximum heating position where the second bypass passage 21 is entirely closed. The air temperature to be blown into the passenger compartment is normally controlled at steps S1702, S1703. In the normal control at steps S1702, 1703, entire air blown by the blower 11 passes the evaporator 9 to be cooled in the evaporator 9, and the air flow ratio between air passing through the heater core 20 and air passing through the second bypass passage 21 is controlled by the open degree of the air mixing door 19, so that the temperature of air to be blown into the passenger compartment is controlled at the target air temperature TAO.

When the cold storage mode is determined at step S1701, the control program proceeds to step S1704. At step S1704, a maximum temperature TMmax of mixing air between air having passed through the evaporator 9 and air having passed through the first bypass passage 16 is calculated based on the bypass temperature TB of air (non cooled air) passing through the bypass passage 16 and the actual evaporator air temperature TE. That is, the maximum temperature TMmax is calculated using the following formula (4).

$$TMmax = F(TE, TB) \quad (4)$$

Then, at step S1705, the maximum temperature TMmax is compared with the target air temperature TAO. When the maximum temperature TMmax is higher than the target air temperature TAO, the mixed air from the evaporator 9 and from the first bypass passage 16 is not need to be heated by the heater core 20, and the control program proceeds to step S1706. At step S1706, the open degree SWM of the air mixing door 19 is set at 0% (SWM=0%) to be positioned at the maximum cooling position indicated by solid lines in FIG. 1.

Then, at step S1707, the target open degree SWB of the bypass door 17 is calculated using the following formula (5).

$$SWB = H(TE, TB, TAO) \quad (5)$$

Wherein, the target open degree SWB is calculated using the actual evaporator air temperature TE, the bypass temperature TB of air passing through the bypass passage 16 and the target air temperature TAO. Then, the bypass door 17 is operated at the target open degree SWB so that the target air temperature TAO is obtained. Here, the target open degree SWB is calculated as percentage in such a manner that the target opening degree SWB is set at 0% when the first bypass passage 16 is fully closed, and is set at 100% when the first bypass passage 16 is fully opened.

When the control at steps S1706, S1707 is performed, the air mixing door 19 is fixed at the maximum cooling position, and the bypass door 17 is set at the target open degree SWB, so that the temperature of air to be blown into the passenger compartment can be controlled. As a result, the cold storage amount of condensed water of the evaporator 9 can be increased in the cold storage mode, and power consumed in the compressor 1 can be reduced.

On the other hand, when the maximum temperature TMmax is lower than the target air temperature TAO at step S1705, the mixed air from the evaporator 9 and the first bypass passage 16 is need to be heated by the heater core 20, and the control program proceeds to step S1708. At step S1708, the target open degree SWB of the bypass door 17 is set at 100% (SWB=100%), so that the bypass door 17 is fixed at a fully opened position of the bypass passage 16. Then, at step S1709, the target open degree SWM of the air mixing door 19 is calculated using the following formula (6).

$$SWM = G(TMmax, TW, TAO) \qquad (6)$$

In this case, the mixed air having the maximum temperature TMmax flows into the heater core 20 and the second bypass passage 21. Therefore, the target open degree SWM of the air mixing door 19 is calculated using the maximum temperature TMmax, the hot water temperature TW flowing through the heater core 20 and the target air temperature TAO. The air mixing door 19 is operated at the target open degree SWM so that the target air temperature TAO can be obtained.

At step S1701, when the cold release mode is determined, that is, when air is cooled using the cold release operation of the condensed water of the evaporator 9 after the engine 4 (compressor 1) is stopped when the vehicle is stopped, the air temperature control at steps S1704–S1709 is performed. At step S1701, when a power saving mode is determined, the air temperature control at steps S1704–S1709 is also performed.

A second embodiment of the present invention will be now described with reference to FIGS. 1, 7–10. In the second embodiment, the present invention is applied to an air conditioner of a hybrid vehicle. In the second embodiment, as shown in FIG. 1, the hybrid vehicle includes a generator 50, a battery unit 51 (battery), a vehicle-driving electric motor (not shown), and the like, in addition to a vehicle-driving gasoline engine (engine) 4. The generator 50 is driven by any one of engine power and inertial power of the vehicle. The battery unit (battery) 51 is charged by the generator 50, and the vehicle-driving electric motor (not shown) is electrically driven by the battery unit 51. In the second embodiment, although a battery such as a nickel-hydrogen storage battery is used as the battery unit 51, a storage capacitor can be also used. Further, a motor generator having a motor function as a power source and a generator function may be used as the generator 50.

The engine 4 is driven when the hybrid vehicle normally travels or when the battery unit 51 is need to be charged, and the vehicle-driving electric motor is operated when the hybrid vehicle is started. Accordingly, the battery unit 51 is controlled to be always charged and stored by electric power P (e.g., for maintaining 1000 watts for two seconds) need to start the hybrid vehicle. When the vehicle travels using inertial power on a slope or the like, the battery unit 51 is charged by the generator 50 driven using the inertial power, so that the inertial power is recovered. Further, in this case, the cold storage mode described in the first embodiment ban be operated using the inertial power. That is, the cold storage operation of the condensed water of the evaporator 9 can be performed by driving the compressor 1 using the inertial power, so that the inertial power is recovered as the cold storage amount.

Figure 7:
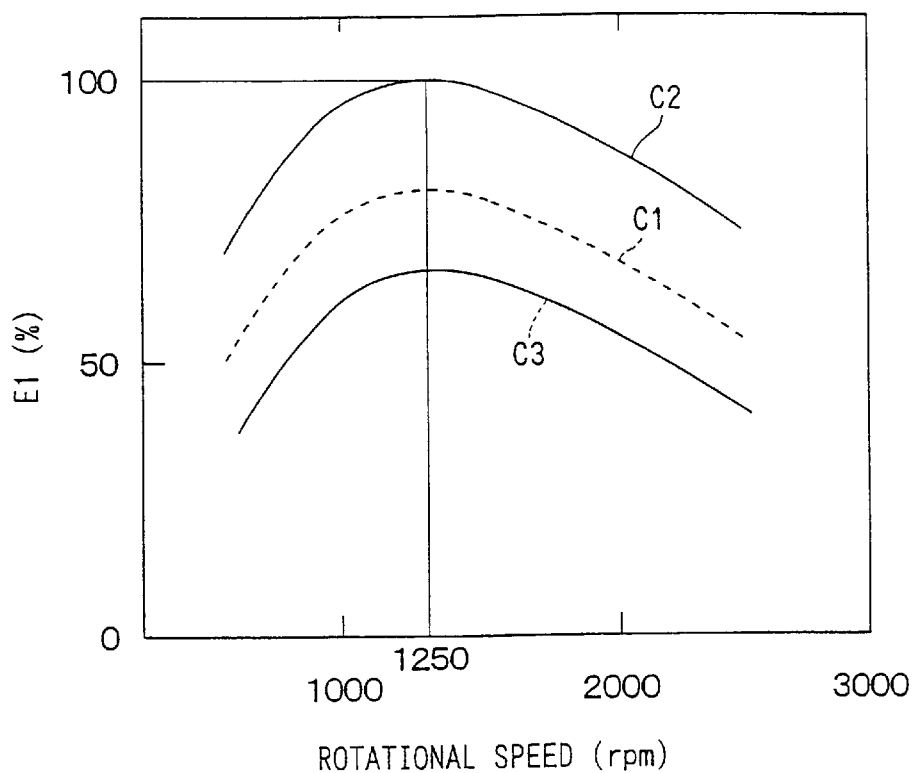
FIG. 7 is a characteristic graph showing a relationship between a rotational speed of a compressor and operational efficiency E1 thereof, according to a second embodiment of the present invention.
Figure 8:
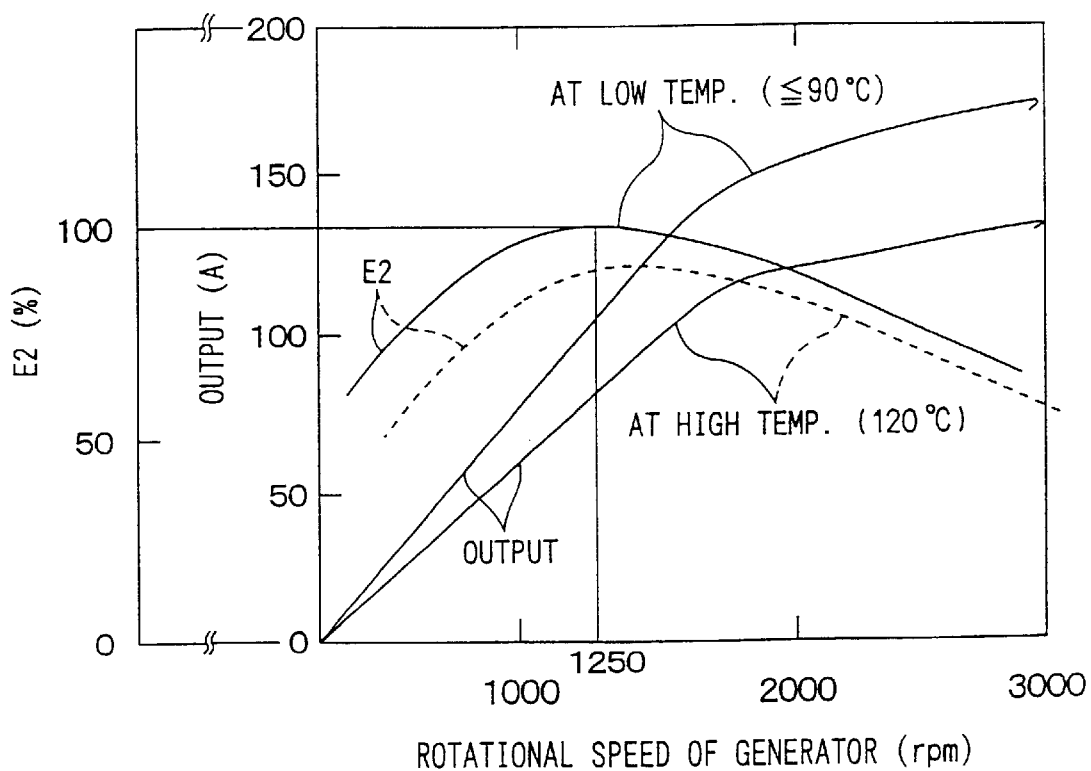
FIG. 8 is a characteristic graph showing a relationship between a rotational speed of a generator and operational efficiency E2 thereof according to the second embodiment.

Here, operational efficiency E1, that is conversion efficiency from kinetic energy due to the engine power and the inertial power to thermal energy due to the cold storage operation, of the compressor 1 is changed in accordance with a rotational speed of the compressor 1. In an example shown in FIG. 7, the operational efficiency E1 of the compressor 1 becomes maximum at a rotational speed of 1250 rpm of the compressor 1. Here, the maximum operational efficiency of the compressor 1 at the rotation speed of 1250 rpm is set at 100%. At this rotational speed of 1250 rpm, recovering efficiency of the compressor 1 for the inertial power becomes highest. When a capacity-variable type compressor is used as the compressor 1, the operational efficiency E1 is changed in accordance with the graph C1 shown by the chain line in FIG. 7. In FIG. 7, C1 shows a capacity-variable type compressor having a capacity of 40 cc, for example, C2 shows a compressor having an external-variable maximum capacity of 161 cc, for example, and C3 shows a compressor having an external-variable minimum capacity of 20 cc.

Further, operational efficiency E2, that is conversion efficiency from kinetic energy due to the engine power and the inertial power to electrical energy due to the charging operation, of the generator 50 is changed in accordance with a rotational speed of the generator 50 and an atmospheric temperature. In an example shown in FIG. 8, in a low temperature equal to or lower than 90° C., the operational efficiency E2 of the generator 50 becomes maximum at a rotational speed of 1250 rpm of the generator 50. Here, the maximum operational efficiency E2 of the generator 50 at the rotation speed of 1250 rpm is set at 100%. At the rotational speed of 1250 rpm, recovering efficiency of the inertial power becomes maximum. At a high temperature 120° C., for example, the operational efficiency E2 is indicated by the broken-line graph in FIG. 8.

Figure 9:
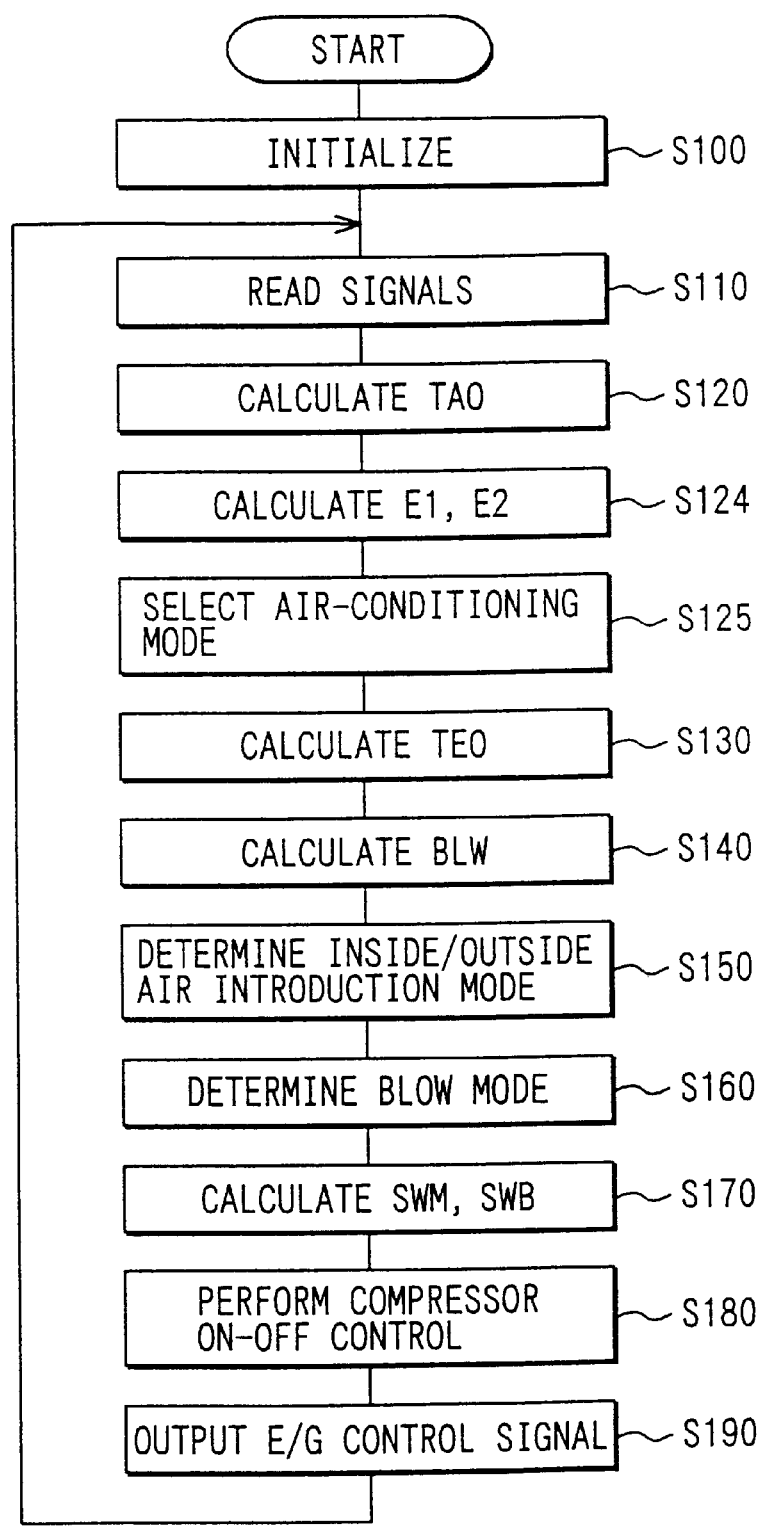
FIG. 9 is a flow diagram showing basic control processes according to the second embodiment.

The control operation of the second embodiment will be now described with reference to the flow diagram of FIG. 9. In FIG. 9, steps similar to those in FIG. 2 are indicated by the same step numbers, and detail explanation thereof is omitted.

As shown in FIG. 9, at step S124, rotational speed fluctuations of the compressor 1 and the generator 50 in the recovery time zone T3 are estimated using the travel state information and the traffic signal information from the navigation unit 40. Then, fluctuations of the operational efficiency E1, E2 of the compressor 1 and the generator 50 in the recovery time zone T3 are calculated using the estimated rotational speed fluctuations, respectively.

When the necessary cold release amount Q and the necessary electric power P are not obtained, the recovery time zone T3 is divided to a driving time zone of the compressor 1 and a driving time zone of the generator 50 so that the inertial power can be recovered at high efficiency of both operational efficiency E1, E2 of the compressor 1 and the generator 50. For example, when the operational efficiency E1 of the compressor 1 is higher than the operational efficiency E2 of the generator 50, the necessary electric power P is recovered from the generator 50 after the necessary cold release amount Q is recovered from the compressor 1. On the other hand, when the operational efficiency E1 of the compressor 1 is smaller than the operational efficiency E2 of the generator 50, the necessary electric power P is recovered from the compressor 1, after the necessary cold release amount Q is recovered from the generator 50.

Figure 10:
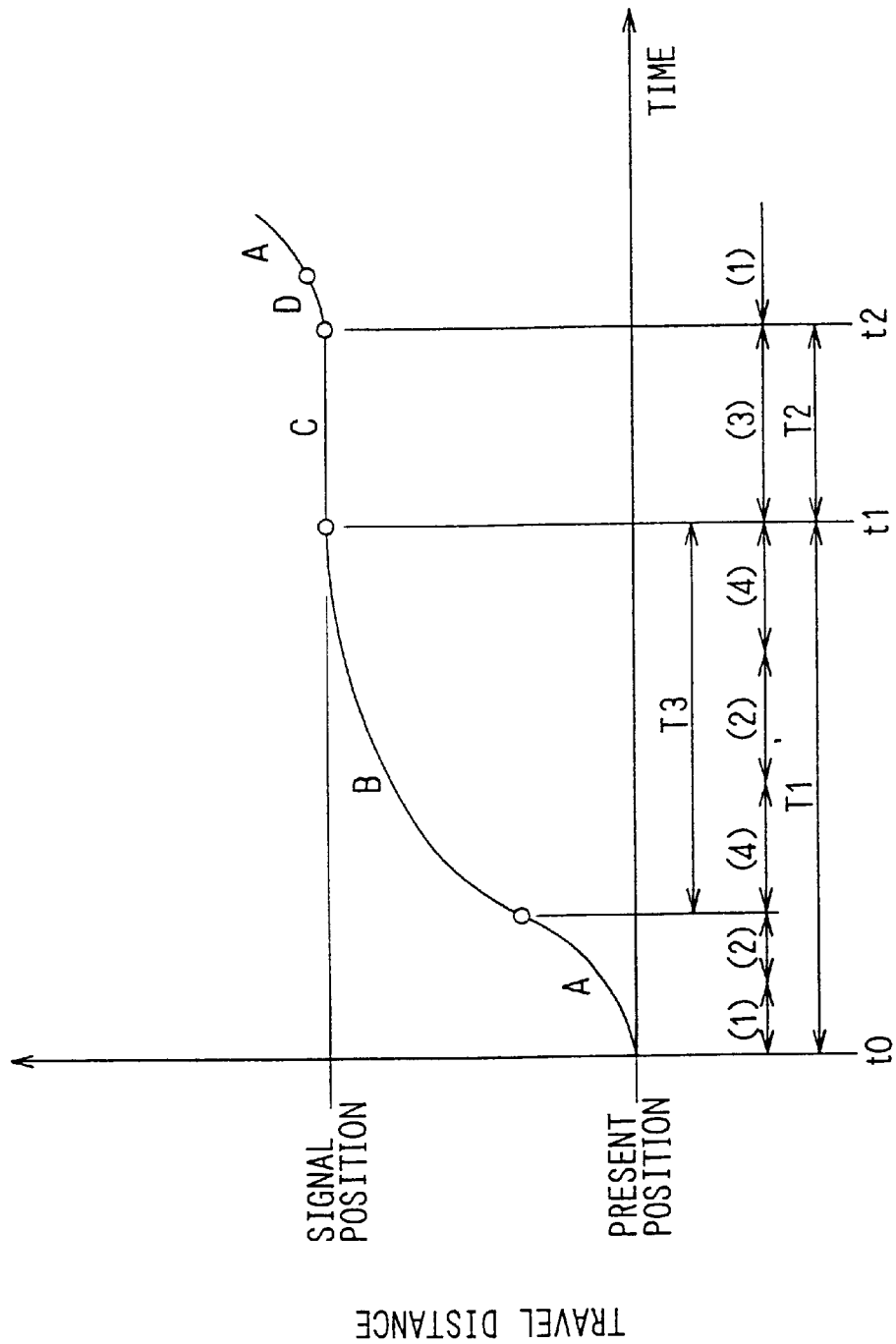
FIG. 10 is a graph for explaining a mode selection in the air-conditioning mode according to the second embodiment.

FIG. 10 shows the vehicle travel state and the air-conditioning mode on a graph showing a relationship between the time and the travel distance. In FIG. 10, A indicates the vehicle travel state using engine power, B indicates the vehicle travel state using inertial power such as on a downward slope, C indicates the vehicle stopping state, and D indicates a vehicle travel state using battery power. In FIG. 10, reference number (1) indicates a time zone where the normal cooling mode is selected, reference number (2) indicates a time zone where the cold storage mode is selected, reference number (3) indicates a time zone where the cold release mode is selected, and reference number (4) indicate a battery-charge time zone where the generator 50 is driven to charge the battery unit 51. Further, t0, t1, t2 indicate the present time, a time at which the vehicle will be stopped next, and a time at which the vehicle will be again started, respectively.

In the example shown in FIG. 10, the recovery time zone T3 is estimated within the necessary time T1, and the cold storage operation (time zone (2)) and the battery charge operation (time zone (4)) are performed preferentially for the recovery time zone T3 within the necessary time T1. Thus, for example, the recovery time zone T3 is divided into the battery charge time zone (4), the cold storage time zone (2) and the battery charge time zone (4) in this order. In the second embodiment, when it is determined that the necessary cold release amount Q is not obtained using the cold storage operation only in the recovery time zone T3, the cold storage operation (time zone (2)) is performed also in the time zone A of engine-driving travel. Thus, the necessary cold release amount Q and the necessary electric power P can be ensured in the necessary time T1.

In the second embodiment, the other parts are similar to those of the above-described first embodiment.

Figure 11A:
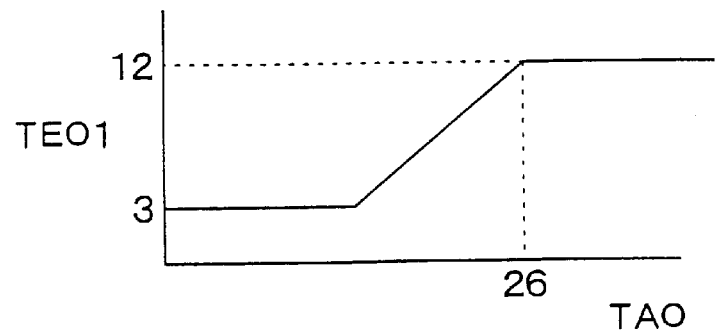
FIG. 11A is a characteristic graph showing a relationship between a first target evaporator air temperature TEO1 and the target air temperature TAO.
Figure 11B:
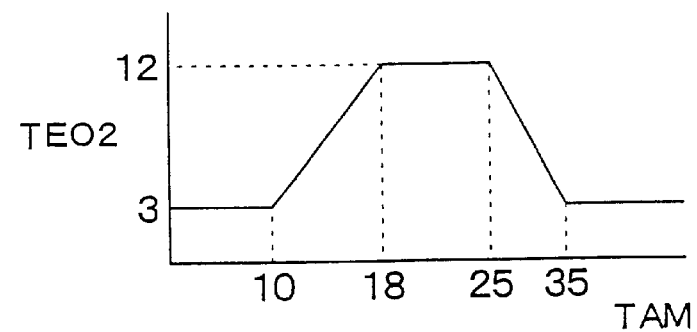
FIG. 11B is a characteristic graph showing a relationship between a second target evaporator air temperature TEO2 and the outside air temperature TAM.
Figure 11C:
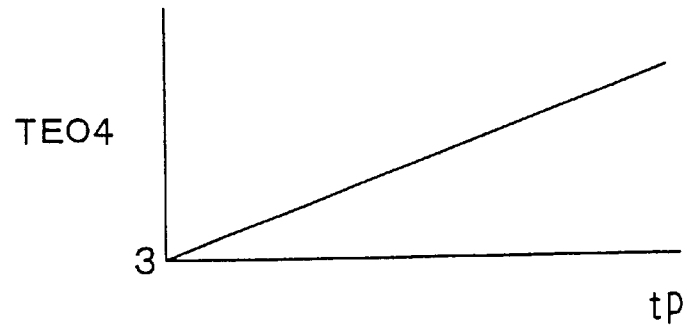
FIG. 11C is a characteristic graph showing a relationship between a fourth target evaporator air temperature TEO4 and a passed time tP after an economy mode is set, according to a third embodiment of the present invention.

A third embodiment of the present invention will be now described with reference to FIGS. 11A–11C. In the third embodiment, an economy mode switch is provided in the operation switch group 37 on the air-conditioning panel 36. When the economy mode switch is turned on, an economy mode is set, and the calculation of the target evaporator air temperature TEO at step S130 in the first embodiment shown in FIG. 2 is changed as follows. In the economy mode, a lower limit temperature of the target evaporator air temperature TEO is set at 3° C., and first, second and fourth target evaporator temperatures TEO1, TEO2, TEO4 are calculated based on characteristic graphs in FIGS. 11A–11C, respectively. In FIG. 11C, tP indicates a passing time after the economy mode switch is turned on. In the third embodiment, the target evaporator air temperature TEO is set at a lowest temperature among the first, second and fourth target evaporator temperatures TEO1, TEO2, TEO4 determined in FIGS. 11A–11C.

Accordingly, in the third embodiment, the power consumed in the engine 4 for driving the compressor 1 can be further reduced. Further, by suitably selecting the cold storage mode and the normal cooling mode, the engine power can be saved in the economy mode, while cooling feeling can be sufficiently improved using the cold release operation when the engine 4 is stopped. In the third embodiment, the other parts are similar to those of the above-described first embodiments.

Figure 12:
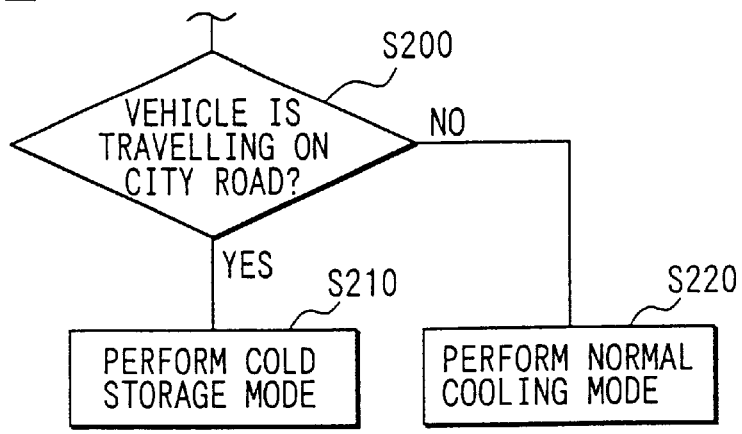
FIG. 12 is a flow diagram showing a part control in a vehicle air conditioner according to a fourth embodiment of the present invention.

A fourth embodiment of the present invention will be now described with reference to FIG. 12. In the fourth embodiment, a vehicle speed signal is inputted to a memory device of the air-conditioning ECU 5 from a vehicle speed sensor (not shown) through the engine ECU 38, and is stored therein. Next, at step S200, it is determined, based on the past speed signal stored in the memory device of the air-conditioning ECU 5, whether the vehicle is travelling on a city road where the vehicle is stopped every predetermined time. When it is determined that the vehicle is travelling on a city road, the cold storage mode is selected to be performed at step S210. When it is determined that the vehicle is not travelling on a city road, the normal cooling mode is performed at step S220.

For example, a travel pattern on a city road is a repeat from a start to a stop (e.g., waiting for a traffic signal) trough a travel and speed reduction in this order. The speed change pattern on the city road is almost constant in each area. Therefore, when the vehicle travel change pattern is similar to the past speed change pattern on a city road, it can be determined that the vehicle is travelling on the city road at step S200. Alternatively, when an average vehicle speed for a past predetermined time (e.g., 10 minutes) is low (e.g., 15 km/h), or when the number of vehicle stop for a past predetermined time (e.g., five minutes) is equal to or higher than the predetermined number (e.g., one), it can be determined that the vehicle is in traffic congestion, and can be determined that the vehicle is travelling on a city road. The above determination at step S200 may be made effective only when the vehicle speed is equal to or lower than a predetermined speed (e.g., 40 km/h).

A speed detection device is not limited to that using the vehicle speed sensor for detecting the vehicle speed, but can be a speed-information detection device for detecting a vehicle speed information such as an engine rotation speed, a gearshift position, a fuel injection amount, an accelerator-pedal open degree and a brake signal. In this case, the vehicle speed may be calculated based on the described vehicle speed information.

In the fourth embodiment, alternatively, only when the vehicle speed is equal to or lower than a predetermined speed (e.g., 40 km/h), it can be determined that the vehicle is travelling on the city road at step S200.

In the fourth embodiment, the cold storage amount may be excessive or deficient due to a switching control between the normal cooling mode and the cold storage mode based on the above determination at step S200. This excess/deficiency result may be used to correct the next determination. That is, when the necessary cold storage amount Q is not obtained, the correction is performed so that the cold storage amount is increased at the next determination. For example, in a case where it is determined that the vehicle is travelling on a city road when the vehicle speed is equal to or lower than 40 km/h, when the cold storage amount is insufficient, the correction is performed at the next determination so that it is determined that the vehicle is travelling on a city road when the vehicle speed is equal to or lower than 45 km/h. Alternatively, in this case, the past predetermined time described above is corrected to be longer.

In the fourth embodiment, the necessary time period T1 and the vehicle stopping time period T2 described in the first embodiment can be estimated based on the past vehicle speed signal when the vehicle travels, and the necessary cold release amount Q required for the vehicle stopping time period T2 is calculated. In this case, the switching operation may be performed between the normal cooling mode and the cold storage mode so that the cold storage operation is performed based on the necessary cold release amount Q in the necessary time period T1. Further, the speed detection device and the memory device may be eliminated, and it can be determined that the vehicle is travelling on a city road using traffic congestion information from the outside, such as VICS. In the fourth embodiment, the other parts are similar to those of the above-described first embodiment, and the detail description thereof is omitted.

Figure 13:
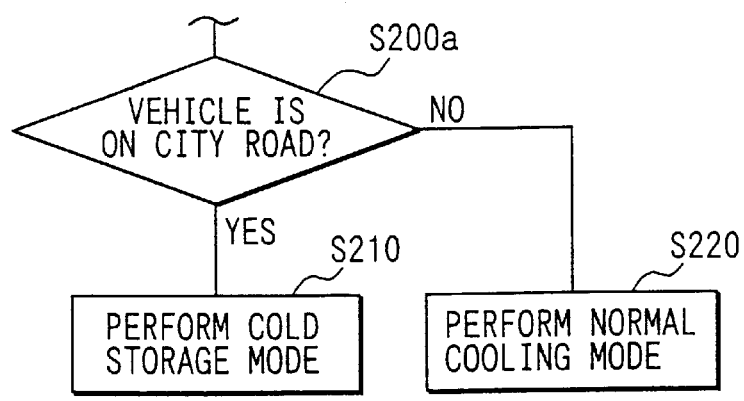
FIG. 13 is a flow diagram showing a part control in a vehicle air conditioner according to a fifth embodiment of the present invention.

A fifth embodiment of the present invention will be now described with reference to FIG. 13. In the fifth embodiment, the present position of the vehicle is determined using the navigation unit 40 based on signals from the receiving device (position detecting device) 42 for receiving a satellite signal such as a signal from GPS. The navigation unit 40 can store a map information from a Compact-Disc Read-Only-Memory (CD-ROM) and the like. Further, the navigation unit 40 includes a city-road travel determination device for determining whether the present position of the vehicle is on a city road based on the map information. In the fifth embodiment, as shown in FIG. 13, when it is determined that the vehicle present position is on a city road at step S200a, the cold storage mode is selected to be performed at step S210. On the other hand, when it is determined that the vehicle present position is not on a city road at step S200a, the normal cooling mode is selected to be performed at step S220.

For example, when a distance between neighboring traffic signals is shorter than a predetermined distance around the present position of the vehicle, it is determined that the vehicle is on a city road. A specific area is beforehand set as a city road in a map of the map information stored in the navigation unit 40, and it can be determined that the vehicle is on a city road when the present position is in the specific area. When the present position is on a highway, it is determined that the vehicle is outside a city road. When the present position is in an area where a distance from an interchange or a parking area is equal to or shorter than a predetermined distance (e.g., 2 km), it can be determined that vehicle is on a city road. Alternatively, only when the present position is on a city road and a brake operation is performed, it can be determined that the vehicle travels on a city road.

As described above, when the city-road travel determination means determines that the vehicle travels on a city road at step S200a in FIG. 13, the cold storage mode is selected at step S210. When the city-road travel determination means determines that the vehicle travels outside a city road at step S200a, the normal cooling mode is selected at step S220. Therefore, the cold storage amount can be further restricted from being excessive or deficient, so that the cooling feeling can be improved even when the engine 4 is stopped while the engine power can be saved.

In a modification of the fifth embodiment, it can be determined whether vehicle is stopped at the next traffic signal based an accelerator-pedal open degree, an engine rotational speed, and a brake signal. When the vehicle is determined to be stopped at the next traffic signal, the cold storage mode can be selected.

Figure 14:
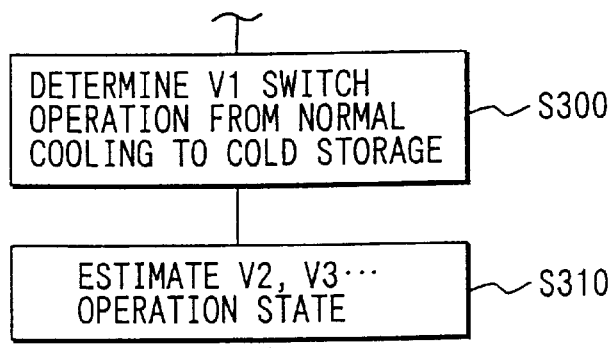
FIG. 14 is a flow diagram showing a part control in a vehicle air conditioner according to a sixth embodiment of the present invention.

A sixth embodiment of the present invention will be now described with reference to FIG. 14. In the sixth embodiment, the vehicle includes a transmitting device for transmitting operation information and the travel state information to other vehicles, and a receiving device for receiving the operation information and the travel state information from the other vehicles. Here, the operation information is for selecting the cold storage mode, the normal cooling mode or the cold release mode. When a second vehicle V2 travels in the normal cooling mode at a rear side of a first vehicle V1 traveling in the normal cooling mode, when the first vehicle V1 is switched from the normal cooling mode to the cold storage mode at step S300, the operation state of the second vehicle V2 is estimated at step S310. Specifically, when the first vehicle V1 is switched from the normal cooling mode to the cold storage mode at step S300, it is estimated whether or not it is necessary to switch the normal cooling mode to the cold storage mode in the second vehicle V2 when the second vehicle V2 reaches the present position of the first vehicle V1, based on vehicle information of the first vehicle V1 (the switch operation information and the travel state information of the first vehicle V1) in addition to the travel state information of the second vehicle V2 and the traffic signal information. Similarly, when a third vehicle V3 travels in the normal cooling mode at a rear side of the second vehicle V2, the third vehicle V3 can use the vehicle information of the first and second vehicles V1, V2. Thus, it can determine whether or not the normal cooling mode is need to be switched to the cold storage mode in the third vehicle V3 when the third vehicle V3 reaches the present position of the first vehicle V1. Such vehicle information can be sequentially transmitted to the rear side vehicles at step S310. In the sixth embodiment, the other parts are similar to those of the above-described first embodiment.

Although the present invention has been fully described in connection with preferred embodiments thereof with reference to the accompanying drawings, it is to be noted that various changes and modifications will become apparent to those skilled in the art.

For example, in the above-described first embodiment, the necessary time period T1 can be estimated based on the vehicle-travel state information and road information such as traffic congestion information from VICS and the like, without using the traffic signal information. In this case, the cold storage operation is controlled so that the necessary cold release amount Q, required for the next vehicle stopping time period T2, is stored in the estimated necessary time period T1. Further, the vehicle stopping time period T2, between a time at which the vehicle is stopped next and a time at which the vehicle is again started, may be estimated based on the road information such as traffic congestion information from VICS and the like.

In the above-described embodiments, the actual evaporator air temperature TE is controlled to be maintained at the target evaporator air temperature TEO by the on/off control of the compressor 1. However, when a capacity-variable type compressor, where a compression capacity is variable, is used as the compressor 1, the evaporator air temperature TE can be controlled by controlling the compression capacity in place of the ON-OFF control for the compressor 1.

In the above-described embodiments, the air-conditioning operation is selected between the cold storage mode and the normal cooling mode while the engine is driven. However, only the normal cooling operation may be performed in place of the switching operation between the cold storage mode and the normal cooling mode. In this case, when the cold storage mode is determined at step S125, a flow amount (mass flow amount) of refrigerant discharged from the compressor 1 is increased, so that the cold storage operation can be performed by increasing the cold storage amount of condensed water of the evaporator 9 in the normal cooling mode.

In FIG. 1, the first bypass passage 16, the bypass door 17 and the bypass air temperature sensor 33 can be omitted, and the temperature of air (blown air) to be blown into the passenger compartment can be controlled only by the air mixing door 19. For example, when suction air having a temperature of 25° C. is cooled so that air having a temperature of 10° C. is blown into the passenger compartment, the temperature of the entire suction air at 25° C. is reduced to −2° C. by the evaporator 9, and thereafter, is increased by the heater core 20, so that air having temperature of 10° C. can be obtained. That is, in the above-described embodiments, the structure of the air conditioning unit and the blower unit can be suitably changed.

Such changes and modifications are to be understood as being within the scope of the present invention as defined by the appended claims.

What is claimed is:

1. An air conditioner for a vehicle including a navigation unit for searching vehicle-travel state information and road information, the air conditioner comprising:

an evaporator for cooling air to be blown into a passenger compartment of the vehicle;

a compressor driven by power of a vehicle engine, for compressing and discharging refrigerant having passed through the evaporator;

a cold storage unit for performing a cold storage operation using cooling operation of the evaporator; and a control unit for controlling cooling temperature of the evaporator, wherein:

when the vehicle engine is driven, the control unit selects one of a cold storage mode where the cooling temperature of the evaporator is made lower than a predetermined temperature so that the cold storage operation in the cold storage unit is performed, and a normal cooling mode where the cooling temperature of the evaporator is higher than that in the cold storage mode;

when the vehicle engine is stopped, the control unit selects a cold release mode where air is cooled by using cold release operation from the cold storage unit;

the control unit estimates a necessary time period from a present time to a time at which the vehicle is stopped next, and a vehicle stopping time period from the time at which the vehicle is stopped next and a time at which the vehicle is re-started, based on the vehicle-travel state information and the road information searched by the navigation unit;

the control unit calculates a necessary cold release amount necessary for cooling in the vehicle-stopping time period, based on the estimated vehicle-stopping time period; and the control unit controls operation of the cold storage mode so that the cold storage is performed in the necessary time period by a cold storage amount corresponding to the necessary cold release amount.

2. The air conditioner according to claim 1, wherein:

the navigation unit includes a travel state detection device for detecting the vehicle-travel state information including at least a vehicle present position, a vehicle-travel direction and a vehicle-travel speed;

road information includes at least traffic signal information for indicating a traffic signal position and a switching operation thereof; and the control unit estimates the necessary time period and the vehicle-stopping time period based on the vehicle-travel state information and the traffic signal information, while the vehicle travels.

3. The air conditioner according to claim 2, wherein the traffic signal information is obtained by a wireless communication system from an outside of the vehicle.

4. The air conditioner according to claim 1, wherein the control unit is provided to perform communication of the vehicle-travel state information and operation information including selection operation of the cold storage mode, the normal cooling mode and the cold release mode, between the vehicle and another vehicle.

5. The air conditioner according to claim 2, wherein:

the compressor is disposed to recover inertial power of the vehicle using the cold storage operation of the cold storage unit when the compressor is driven by the inertial power;

the control unit estimates a time zone for which the inertial power is recovered, among the necessary time period, based on the vehicle-travel state information and the traffic signal information; and the cold storage mode is preferentially performed in the time zone among the necessary time period.

6. The air conditioner according to claim 5, wherein:

the vehicle further includes a generator driven by one of the power of the vehicle engine and the inertial power, and a battery unit charged by the generator, the control unit controls charging operation of the battery unit to charge necessary electric power required to start the vehicle in the battery unit at least in the necessary time period;

the control unit estimates rotational speed fluctuations of the compressor and the generator in the time zone based on the vehicle-travel state information and the traffic signal information;

the control unit calculates operational efficiency fluctuations of the compressor and the generator in the time zone using the rotational speed fluctuations, respectively; and when an actual cold storage amount of the cold storage unit is smaller than the necessary cold release amount and a charging power of the battery unit is smaller than the necessary electric power, the compressor and the generator are driven while the time zone is divided into a drive time zone of the compressor and a drive time zone of the generator, so that the inertial power is recovered at each high operational efficiency of the compressor and the generator, higher than a predetermined level.

7. The air conditioner according to claim 1, wherein the cold storage unit is disposed in the evaporator.

8. The air conditioner according to claim 1, wherein the cold storage unit is disposed at a downstream air side of the evaporator.

9. The air conditioner according to claim 1, further comprising an air conditioning case defining an air passage through which air flows into the passenger compartment, wherein the evaporator is disposed in the air conditioning case to form a bypass passage through which air bypasses the evaporator.

10. An air conditioner for a vehicle, comprising:

an evaporator for cooling air to be blown into a passenger compartment;

a compressor driven by power of a vehicle engine, for compressing and discharging refrigerant having passed through the evaporator;

a cold storage unit for performing a cold storage operation using cooling operation of the evaporator; and a control unit for controlling cooling temperature of the evaporator, wherein:

when the vehicle engine is driven, the control unit selects one of a cold storage mode where the cooling temperature of the evaporator is made lower than a predetermined temperature so that the cold storage operation in the cold storage unit is performed, and a normal cooling mode where the cooling temperature of the evaporator is higher than that in the cold storage mode;

when the vehicle engine is stopped, the control unit selects a cold release mode where air is cooled by using cold release operation from the cold storage unit;

the control unit includes vehicle speed detection means for obtaining vehicle speed information relative to a vehicle speed, and a memory member for storing the vehicle speed information; and when it is estimated, based on the past vehicle speed information stored in the memory member, that the vehicle travels on a city road in which the vehicle is stopped at every predetermined time, the control unit selects the cold storage mode.

11. The air conditioner according to claim 10, wherein:

the control unit beforehand sets a specific fluctuation pattern of the vehicle speed as a fluctuation pattern of the vehicle speed on a city road; and when the past fluctuation pattern of the vehicle for a past predetermined time is similar to the specific fluctuation pattern, the control unit estimates that the vehicle travels on a city road.

12. The air conditioner according to claim 10, wherein:

the control unit calculates an average vehicle speed for the past predetermined time based on the vehicle speed information; and when the average vehicle speed is lower than a predetermined vehicle speed, the control unit estimates that the vehicle travels on a city road.

13. The air conditioner according to claim 10, wherein:

the control unit calculates a number of vehicle stop for a past predetermined time, based on the vehicle speed information; and when the number of vehicle stop is more than a predetermined number, the control unit determines that the vehicle travels on a city road.

14. The air conditioner according to claim 10, wherein the cold storage unit is disposed in the evaporator.

15. The air conditioner according to claim 10, wherein the cold storage unit is disposed at a downstream air side of the evaporator.

16. An air conditioner for a vehicle, comprising:

an evaporator for cooling air to be blown into a passenger compartment of the vehicle;

a compressor driven by power of a vehicle engine, for compressing and discharging refrigerant having passed through the evaporator;

a cold storage unit for performing a cold storage operation using cooling operation of the evaporator; and a control unit for controlling cooling temperature of the evaporator, wherein:

when the vehicle engine is driven, the control unit selects one of a cold storage mode where the cooling temperature of the evaporator is made lower than a predetermined temperature so that cold storage operation in the cold storage unit is performed, and a normal cooling mode where the cooling temperature of the evaporator is higher than that in the cold storage mode;

when the vehicle engine is stopped, the control unit selects a cold release mode where air is cooled by using cold release operation from the cold storage unit;

when the control unit estimates that the vehicle is on a city road based on a present position of the vehicle and map information, the control unit selects the cold storage mode.

17. The air conditioner according to claim 16, wherein:

the control unit calculates a distance between neighboring traffic signals around the present position of vehicle, based on the present position of the vehicle and the map information; and when the distance is shorter than a predetermined distance, the control unit estimates that the vehicle is on a city road.

18. The air conditioner according to claim 16, wherein:

the control unit beforehand sets a specific area as a city road in the map information; and when the vehicle is in the specific area, the control unit estimates that the vehicle is on a city road.

19. An air conditioner for a vehicle including a navigation unit for searching vehicle-travel state information and road information, the air conditioner comprising:

an evaporator for cooling air to be blown into a passenger compartment of the vehicle;

a compressor driven by power of a vehicle engine, for compressing and discharging refrigerant having passed through the evaporator; and a control unit for controlling cooling temperature of the evaporator, wherein:

when the vehicle engine is driven, the control unit selects one of a cold storage mode where the cooling temperature of the evaporator is made lower than a predetermined temperature to perform cold storage using cooling operation of the evaporator, and a normal cooling mode where the cooling temperature of the evaporator is higher than that in the cold storage mode;

when the vehicle engine is stopped, the control unit selects a cold release mode where air is cooled by using cold release operation of the cold storage;

the control unit estimates a necessary time period from a present time to a time at which the vehicle is stopped next, based on the vehicle-travel state information and the road information searched by the navigation unit;

the control unit calculates a necessary cold release amount necessary for cooling while the vehicle is stopped next, and controls operation of the cold storage mode so that the cold storage is performed to storage the necessary cold release amount in the necessary time period.

20. The air conditioner according to claim 19, wherein:

the control unit estimates a vehicle stopping time period from the time at which the vehicle is stopped next and a time at which the vehicle is re-started, based on the vehicle-travel state information and the road information searched by the navigation unit; and the control unit calculates the necessary cold release amount necessary for cooling in the vehicle-stopping time period, based on the estimated vehicle-stopping time period.

* * * * *

UNITED STATES PATENT AND TRADEMARK OFFICE
CERTIFICATE OF CORRECTION

PATENT NO. : 6,688,120 B2  Page 1 of 1
DATED : February 10, 2004
INVENTOR(S) : Shinji Aoki et al.

It is certified that error appears in the above-identified patent and that said Letters Patent is hereby corrected as shown below:

<u>Title page,</u>
Item [30], Foreign Application Priority Data, "Jan. 23, 2002 (JP) 2001-013999" should be -- Jan. 23, 2002 (JP) 2002-013999 --

Signed and Sealed this

Twenty-second Day of June, 2004

JON W. DUDAS
*Acting Director of the United States Patent and Trademark Office*